United States Patent [19]

Ishii et al.

[11] Patent Number: 4,821,065
[45] Date of Patent: Apr. 11, 1989

[54] RECORDING APPARATUS HAVING CONTROLLABLE RECORDING BEAM STATES

[75] Inventors: Hiroaki Ishii, Tokyo; Yukio Sato; Yutaka Udagawa, both of Kawasaki; Masafumi Wataya, Tokyo, all of Japan

[73] Assignee: Canon Kabushiki Kaisha, Tokyo, Japan

[21] Appl. No.: 945,943

[22] Filed: Dec. 24, 1986

[30] Foreign Application Priority Data

Jan. 10, 1986 [JP] Japan ................... 61-2232
Jan. 10, 1986 [JP] Japan ................... 61-2233

[51] Int. Cl.⁴ .......................... G03G 15/04
[52] U.S. Cl. ................ 355/14 E; 355/4; 346/108; 346/160; 358/300
[58] Field of Search ........ 355/4, 14 R, 14 E, 14 CH, 355/14 D, 68–70; 358/75, 300; 346/157, 160, 108; 250/205

[56] References Cited

U.S. PATENT DOCUMENTS

| | | | |
|---|---|---|---|
| 4,124,294 | 11/1978 | Nakamura | 355/68 |
| 4,248,524 | 2/1981 | Takahashi | 355/14 E |
| 4,326,795 | 4/1982 | Tajima et al. | 355/14 E |
| 4,358,520 | 11/1982 | Hirayama | 430/54 |
| 4,375,328 | 3/1983 | Tsuchiya et al. | 355/14 E |
| 4,408,871 | 10/1983 | Kojima | 355/14 E X |
| 4,420,247 | 12/1983 | Suzuki et al. | 355/14 C |
| 4,443,695 | 4/1984 | Kitamura | 346/160 |
| 4,511,240 | 4/1985 | Suzuki et al. | 355/14 R |
| 4,513,300 | 4/1985 | Tatsuno et al. | 346/160 |
| 4,564,287 | 1/1986 | Suzuki et al. | 355/14 D |
| 4,581,617 | 4/1986 | Yoshimoto et al. | 346/108 |
| 4,583,834 | 4/1986 | Seko et al. | 355/14 R X |
| 4,583,839 | 4/1986 | Suzuki | 355/14 R |
| 4,618,246 | 10/1986 | Nagashima et al. | 355/14 R |
| 4,660,077 | 4/1987 | Kawamura et al. | 358/75 |
| 4,669,862 | 6/1987 | Yagasaki et al. | 355/124 R |

FOREIGN PATENT DOCUMENTS

| | | | |
|---|---|---|---|
| 55-89859 | 7/1980 | Japan | 355/14 E |
| 57-13790 | 1/1982 | Japan | . |
| 57-79264 | 5/1984 | Japan | 355/4 |

Primary Examiner—A. T. Grimley
Assistant Examiner—J. Pendegrass
Attorney, Agent, or Firm—Fitzpatrick, Cella, Harper & Scinto

[57] ABSTRACT

A recording apparatus such as a laser beam printer has a plurality of photosensitive drums and a plurality of laser beam emitting means associated with the respective photosensitive drums and adapted for forming latent images on the respective photosensitive drums. Controlling means are provided for controlling the laser beam emitting power of the respective beam emitting means, in accordance with the result of a determination as to whether the potential of the surface of at least one of the photosensitive drums is at a normal level or whether the laser beam emitting means is at a predetermined level.

11 Claims, 9 Drawing Sheets

RECORDING APPARATUS HAVING CONTROLLABLE RECORDING BEAM STATES

BACKGROUND OF THE INVENTION

1. Field of the Invention

The present invention relates to a recording apparatus such as a laser beam printer.

2. Description of the Prior Art

Figure 1:
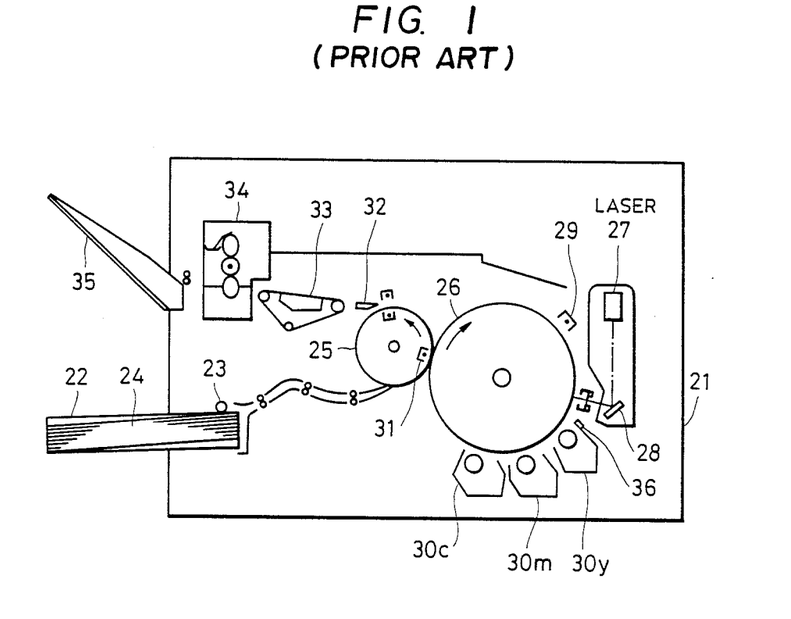
FIG. 1 is a schematic sectional view of a known laser beam printer of single-drum type.

Referring to FIG. 1, a known laser beam printer of a single-drum type has a chassis 21 which carries a sheet cassette 22 holding a stack of sheets of paper 24. The sheets of paper 24 are fed one-by-one by means of a sheet feeding roller 23. The sheet fed by the feeding roller 23 is wound around a transfer drum 25 and is held on the drum 25 by a gripper which is not shown. A laser unit 27 is adapted to emit a laser beam which is reflected by a scanning mirror 28 so as to scan the surface of a photosensitive drum 26. Reference numeral 29 designates a primary corona charger for uniformly charging the photosensitive drum 26. The laser beam printer further has developing devices 30y, 30m and 30c which are adapted to develop a latent image on the photosensitive drum 26 with developing color toners of yellow, magenta and cyan, respectively, so as to make the latent image visible in respective colors. The thus formed image is transferred to the sheet of paper 24 on the transfer drum 25 by means of a transfer charger 31. After the completion of the image-forming process, the sheet of paper 24 is separated from the transfer drum 25 by means of a separation claw 32. A reference numeral 33 denotes a conveyer belt which conveys the sheet of paper 24 to a fixing device 34 where the image is fixed. The sheet is then discharged to a sheet discharge tray 35. The electrical potential on the surface of the photosensitive drum 26 is detected by a potential sensor 36. The laser unit 27 is composed of a semiconductor laser, a polygonal mirror, an image-forming lens, and other parts (not shown).

The operation of this known laser beam printer, which has been described with reference to FIG. 1, is as follows.

The photosensitive drum 26 is uniformly charged by means of the primary corona charger 29. A laser beam emitted from the laser unit 27 is reflected by the scanning mirror 28 and is applied to the surface of the photosensitive drum 26 so as to scan the latter in a main scanning direction which coincides with the axial direction of the drum, whereby a latent image corresponding to an image signal is formed. Then, the latent image is developed to make the yellow portions of the image visible by the developing device 30y, using yellow toner. Meanwhile, the sheet of paper 24 has been fed from the sheet cassette 22 and wound around the transfer drum 25. The yellow toner image is transferred from the photosensitive drum 26 to the transfer drum 25 by a corona discharge from the transfer charger 31.

Then, the formation of a latent image and its development are then repeated for the magenta and cyan colors, and the thus formed images using magenta and cyan toners are successively transferred to the sheet of paper 24. After the completion of the transfer of the toner images of the three different colors, the sheet of paper 24 is separated from the transfer drum 25 and is conveyed by the conveyer belt 33 to the fixing device 34, where the toner images are fixed on the sheet of paper 24 by heat and pressure. The sheet of paper carrying the fixed image is then discharged to the discharge tray 35.

The photosensitive drum 26 and the transfer drum 25 rotate at the same peripheral speed in the directions of the arrows shown in FIG. 1.

During this operation, the quantity of the electric charge on the photosensitive drum 26 is detected by the potential sensor 36 which delivers to a control section (not shown) a signal for controlling the setting of developing bias, thereby controlling the electric potential of the surface of the photosensitive drum 26.

Figure 2:
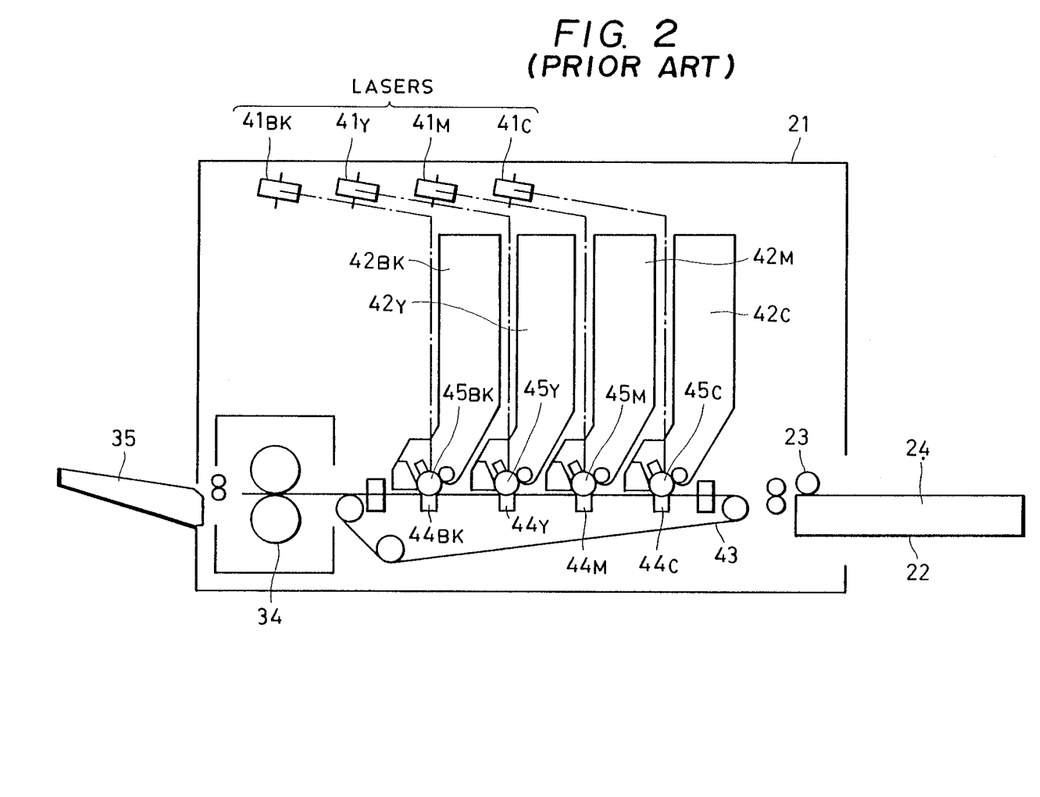
FIG. 2 is a schematic sectional view of a known laser beam printer of 4-drum type.

FIG. 2 shows, by way of example, a 4-drum type laser beam printer. In this Figure, the same reference numerals are used to denote the same parts as those in FIG. 1.

This printer has a first laser unit $41_C$ which is adapted for forming a latent image on a photosensitive drum $45_C$ for cyan color, in accordance with color picture data contained in an image signal. The printer also has a second laser unit $41_M$ which is adapted to form a latent image on a photosensitive drum $45_M$ for magenta color, in accordance with the color picture signal. Similarly, a third laser unit $41_Y$ forms a latent image on a photosensitive drum $45_Y$ for yellow color, in accordance with the color picture data, and a fourth laser unit $41_{BK}$ forms a latent image on a photosensitive drum $45_{BK}$ for black color, in accordance with the color picture data.

Toner hoppers $42_C$, $42_M$, $42_Y$ and $42_{BK}$ are charged with toners of respective colors: namely, cyan, magenta, yellow and black. Transfer charges $44_C$, $44_M$, $44_Y$ and $44_{BK}$, which are associated with respective photosensitive drums, operate to transfer the toner images to the sheet of paper 24 which is being conveyed by a conveyer belt 43. Each of the laser units $41_C$, $41_M$, $41_Y$ and $41_{BK}$ has a semiconductor polygonal mirror which is adapted to direct the laser beam to the associated photosensitive drum thereby scanning the drum in the direction of the axis of the drum.

In operation, the laser units $41_C$, $41_M$, $41_Y$ and $41_{BK}$ emit laser beams which are turned on and off in accordance with the color picture data. The laser beams are applied to respective photosensitive drums $45_C$, $45_M$, $45_Y$ and $45_{BK}$ which have been uniformly charged beforehand, so that latent images of respective colors are formed on the photosensitive drums. These latent images are changed into visible images by the toners of cyan, magenta, yellow and black colors supplied from respective toner hoppers $42_C$, $42_M$, $42_Y$ and $42_{BK}$. The visible toner images of respective colors are then transferred by the transfer chargers $44_C$, $44_M$, $44_Y$ and $44_{BK}$ onto the sheet of recording paper 24 which is being conveyed by the conveyer belt 43. The transferred images are then fixed by the fixing device 34 and the sheet of recording paper 24 carrying the fixed image is discharged to a discharge tray 35.

The laser beam printer of single-drum type shown in FIG. 1 suffers from the problem that the transfer drum 25 must have a large circumferential length corresponding to the length of the sheet of recording paper to be processed. Thus, when the laser beam printer is required to process a recording paper sheet of, for example, A-3 size, the transfer drum 25 is required to have a considerably large diameter with the result that the overall size of the laser beam printer is increased to an impractical extent.

On the other hand, the laser beam printer of the 4-drum type shown in FIG. 2 encounters a problem due to the different rates of degradation in the sensitivity occurring in the photosensitive drums $45_C$, $45_M$, $45_Y$ and $45_{BK}$ with use. In other words, different degradation rates cause relative differences in the sensitivity of these photosensitive drums. If one or more of the drums are renewed, the balance of the colors in the reproduced image is impaired with the result that the quality of the print image deteriorates to such an extent that, for practical purposes, the acceptable reproduction of the color image is impossible to achieve.

Another problem encountered with the 4-drum type laser beam printer shown in FIG. 2 is that, if the level of the laser power exceeds a predetermined control limit in one or more of the laser units $41_C$, $41_M$, $41_Y$ and $41_{BK}$, the color balance is changed resulting in deterioration of the hues of the reproduced color image.

SUMMARY OF THE INVENTION

Accordingly, an object of the present invention is to overcome the above-described problems in the prior art.

Another object of the present invention is to provide an improved recording apparatus.

Still another object of the present invention is to provide a recording apparatus which can provide a reproduced image of high quality.

A further object of the present invention is to provide a recording apparatus of simple design but yet capable of providing an excellent reproduced image.

A still further object of the present invention is to provide a recording apparatus which is capable of reproducing an image of superior quality at a high speed.

A still further object of the present invention is to provide a recording apparatus which is capable of forming a color image of a high quality.

To these ends, according to one aspect of the present invention, there is provided a recording apparatus comprising: a plurality of recording medium members; a plurality of beam emitting means associated with respective recording medium members; and controlling means adapted to conduct a determination whether at least one of the recording medium members is in a predetermined state and adapted to control the beam emitting means upon determining that it is in the predetermined state.

According to another aspect of the present invention, there is provided a recording apparatus comprising: a plurality of recording medium members; a plurality of beam emitting means associated with respective recording medium members; and controlling means adapted to conduct a determination whether at least one of the beam emitting means is in a predetermined state and to control the beam emitting means upon determining that it is in the predetermined state.

In another aspect of the present invention, there is provided in a recording apparatus the combination of the first and second beam emitting means for emitting first and second beams for recording, first detection means for detecting the power of the first beam emitted from the first beam emitting means, and control means for controlling, in accordance with the detection output from the detection means, the power of the second beam emitted from the second beam emitting means. The control means includes setting means responsive to the output from the detection means which corresponds to a power of the first light beam less than a predetermined level, to set the power of the second light beam in accordance with the output. The invention further comprises second detection means for detecting the power of the second beam from the second beam emitting means. The control means is connected to receive outputs from the first and second detection means and to control the power of the second beam to make it coincide with the power set by the setting means.

The control means controls the power of the second beam to a predetermined level in response to the detection output from the first detection means which corresponds to a power of the first beam reaching the predetermined level, and in response to the detection output of the second detection means.

Also provided are first and second recording mediums arranged in conjunction with the beam emitting means for recording images in accordance with the first and second beams emitted from the first and second beam emitting means.

In still another aspect of the present invention, there are provided in a recording apparatus the combination of first and second beam emitting means for emitting first and second beams for recording, first and second detection means for detecting the power of the first and second beams from the first and second beam emitting means, and control means for controlling the power of the first and second beams in response to the outputs from the first and second detection means. The control means is arranged to maintain a predetermined relationship between the power of the first and second beams and to control the power of the second beam in accordance with the detection output from the first detection means.

These and other objects, features and advantages of the present invention will become clear from the following description of the preferred embodiments taken in conjunction with the accompanying drawings.

DESCRIPTION OF THE PREFERRED EMBODIMENTS

Figure 3:
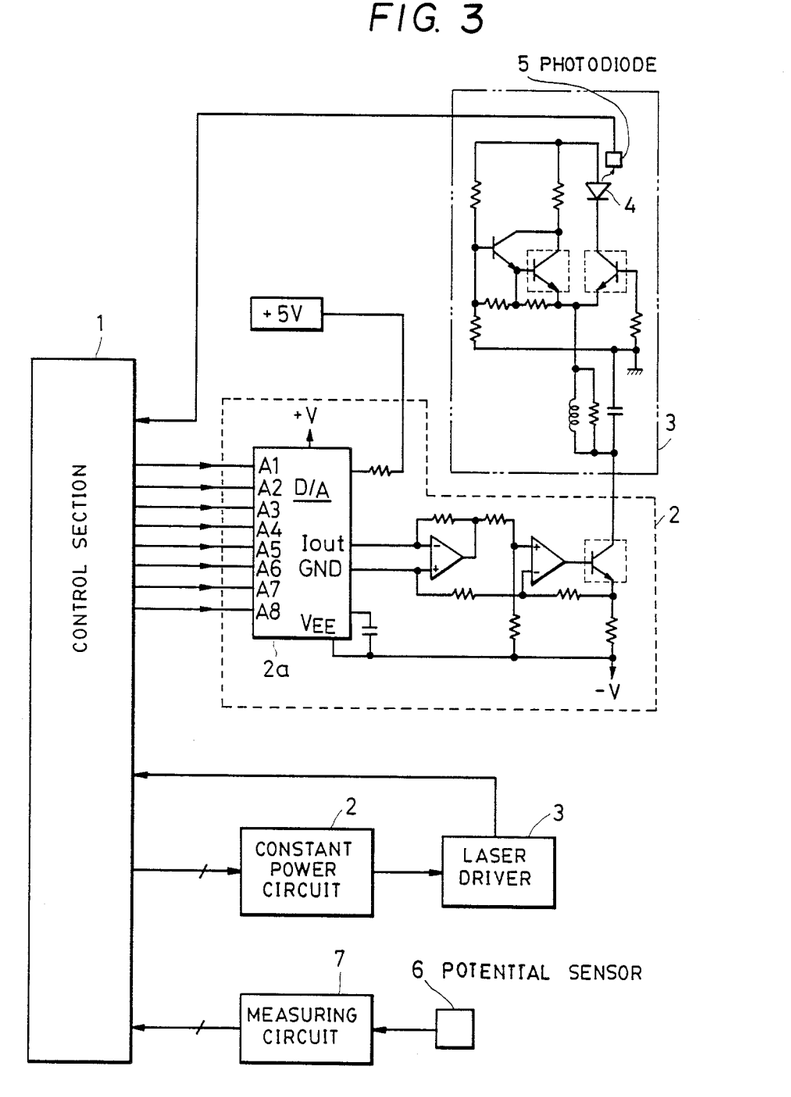
FIG. 3 is a circuit diagram of a control circuit for controlling the operation of a laser beam printer which is a first embodiment of the present invention.

FIG. 3 shows a control circuit for controlling the operation of a laser beam printer embodying the present invention. This control circuit may be used in a 4-drum type laser beam printer of the type shown in FIG. 2, and has the following parts: a control section 1 including a microcomputer which operates also as laser power adjusting means; a constant-current circuit 2 having a D/A converter 2a; a laser driver 3 which drives a semiconductor laser 4 by a driving current from the constant-current circuit 2; a photodiode 5 for sensing the power of the laser beam emitted from the semiconductor laser 4; potential sensors 6 for sensing the electric potentials of the surfaces of respective photosensitive drums; and measuring circuits 7 for computing the levels of electrical potential of the surface of, for example, the photosensitive drum $45_C$ shown in FIG. 2, in response to an output from the associated potential sensors 6. The constant-current circuits 2 having the D/A converters 2a, the laser drivers 3, the semiconductor lasers 4, the photodiodes 5, the potential sensors 6 and the measuring circuits 7 are arranged in a plurality of groups corresponding to respective photosensitive drums, although FIG. 3, for simplicity of illustration, shows only two of these groups. (However, one having ordinary skill in the art will readily understand how to implement the invention for additional groups.) Thus, the control circuit has four such groups when applied to the 4-drum type laser beam printer shown in FIG. 2.

The operation of the control circuit shown in FIG. 3 will be explained with specific reference to FIGS. 4(a) and 4(b) wherein the same reference numerals are used to denote the same components.

Figure 4:
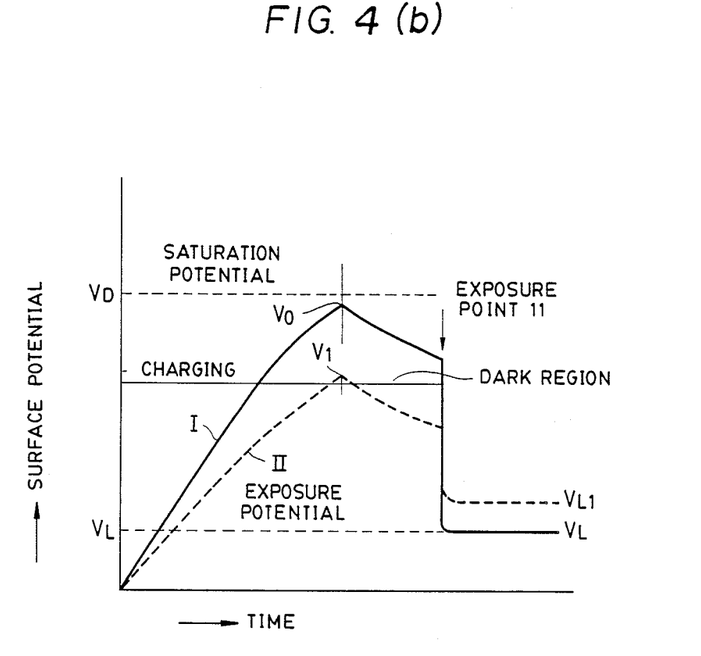
FIG. 4(a) is a schematic illustration of the laser beam printer, showing particularly the position of a potential sensor shown in FIG. 1.
FIG. 4(b) is a graph showing the change in the surface potential of a photosensitive drum in relation to time.
Figure 4A:
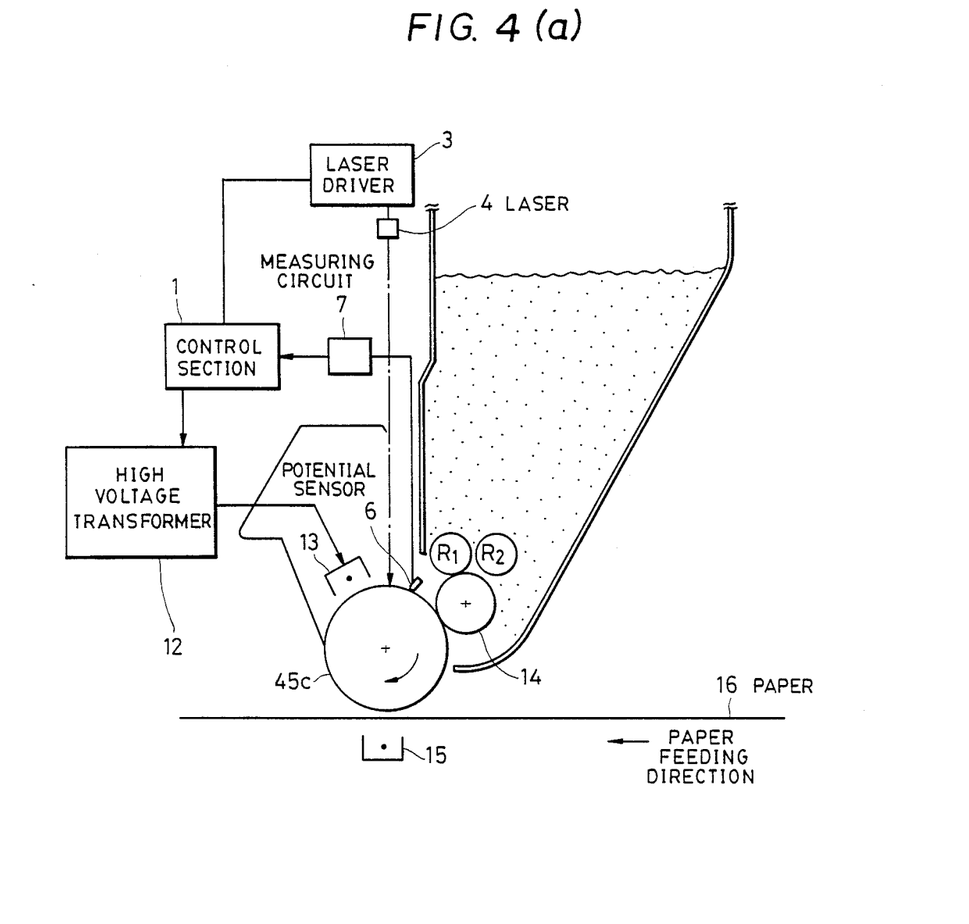

FIG. 4(a) schematically shows the construction of the laser beam printer incorporating the control circuit shown in FIG. 3. This laser beam printer has a construction which is substantially the same as that of the known printer explained in connection with FIG. 2. For simplicity of illustration, only one $45_C$ of the four photosensitive drums and the parts associated with this drum are shown. A laser beam emitted from the semiconductor laser 4 in accordance with the driving current from the laser driver 3 is applied to a point 11 (hereinafter referred to as "exposure point") on the photosensitive drum $45_C$. Prior thereto, the photosensitive drum $45_C$ is uniformly charged by the primary corona charger 13 which performs a corona discharge using the electric power supplied from the high-voltage transformer 12. A developing sleeve 14 is supplied with a toner by the operation of toner supply rollers $R_1$ and $R_2$. The toner is then supplied to the photosensitive drum $45_C$ so as to develop the latent image formed on the drum $45_C$. The developed visible image on the photosensitive drum $45_C$ is transferred, by the operation of a transfer charger 15, to a sheet of recording paper 16 which is being conveyed in the direction of the arrow shown in FIG. 4(a).

FIG. 4(b) illustrates a change in the electrical potential of the surface of the photosensitive drum $45_C$ as a function of time. The ordinate represents surface potential, while the abscissa represents time. A symbol $V_D$ represents the saturation potential, while $V_L$ represents the exposure potential present when the surface of the photosensitive drum $45_C$ is irradiated with a laser beam of a given laser beam power and beam diameter, i.e., when the laser power and the laser beam diameter are maintained constant.

A curve I shows the surface potential characteristic as observed during normal operation, while a curve II represents the surface potential characteristic as observed when the sensitivity of the photosensitive drum has been deteriorated or when the laser power has been reduced.

Referring to the curve I, when the laser beam printer is operating in a normal state, the surface potential of the photosensitive drum $45_C$ is elevated to the level $V_0$ as a result of the charging effected by the primary corona charger 13. However, the potential is lowered owing to dark attenuation, before the charged surface reaches the exposure point 11. As the laser beam is applied to the exposure point 11, provided that the laser power and the laser beam diameter are constant, the surface potential is lowered to the exposure potential $V_L$. If the amount of the exposure, i.e., the power of the laser beam, is large, the amount of the toner which adheres to the photosensitive drum during subsequent development is decreased, so that the density of the image is reduced. Conversely, if the amount of exposure, i.e., the power of the laser beam, is small, a large amount of toner attaches to the drum so that the density of the image is increased.

When the surface potential characteristic of the photosensitive drum $45_C$ has been degraded, however, the surface potential cannot be raised above a level $V_1$ even by the corona discharge effected by the primary corona charger 13, as will be seen from the curve II. The potential level is then lowered as illustrated as a result of the dark attenuation. In this case, therefore, the dynamic range is impractically narrowed at the exposure point 11.

According to the present invention, the potential sensor 6 in the control circuit shown in FIG. 3 senses the potential level of the surface of the photosensitive drum at the exposure point 11, and the control section 1 of the control circuit determines whether the output from the potential sensor is equal to that corresponding to the exposure potential $V_L$ which is obtained when the normal potential characteristic is maintained on the surface of the photosensitive drum. The control section 1 also determines whether the deviation, if any, of the output of the potential sensor from the value corresponding to the normal potential falls within a range (hereinafter referred to as the "controllable range") which can be nullified through an adjustment of the laser power. If the deviation falls within the controllable range, the control section 1 delivers driving current data of, for example, 8 bits, to data is converted into an analog signal by the D/A converter 2a, and the analog signal is delivered to the laser driver 3 so as to adjust the current in the laser driver 3, thereby adjusting the power of the semiconductor laser 4. In consequence, the normal exposure potential $V_L$ is obtained on the surface of the photosensitive drum $45_C$ after the exposure to the laser beam.

As the deterioration of the potential characteristic of the photosensitive drum $45_C$ becomes greater, the deviation of the output of the potential sensor 6 from the value corresponding to the normal exposure potential moves out of the controllable range. Upon determining that the deviation has come out of the controllable range, the control section 1 of the control circuit conducts the following operation. Namely, in this case, a measured surface potential corresponding to $V_{L1}$ sensed by the potential sensor 6 at the exposure point 11 on the photosensitive drum $45_C$ is used as the command exposure potential $V_R$ for the three other photosensitive drums $45_M$, $45_Y$ and $45_{BK}$. More specifically, the constant-current circuit 2 delivers, in accordance with a signal corresponding to the command exposure potential $V_R$, a driving current for adjusting the laser power to the laser driver 3 corresponding to each of the three photosensitive drums $45_M$, $45_Y$ and $45_{BK}$, thereby optimizing the color balance of the color image.

Figure 5A:
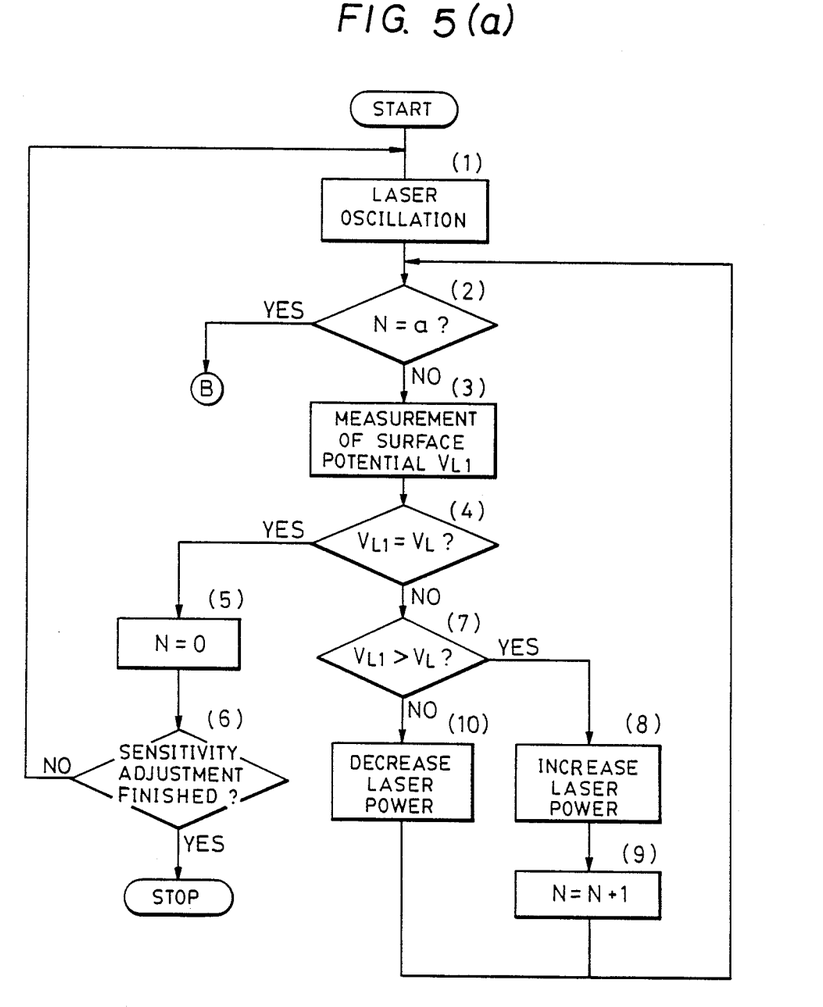
FIGS. 5(a) and 5(b) are flow charts illustrating the process for adjusting laser power.
Figure 5B:
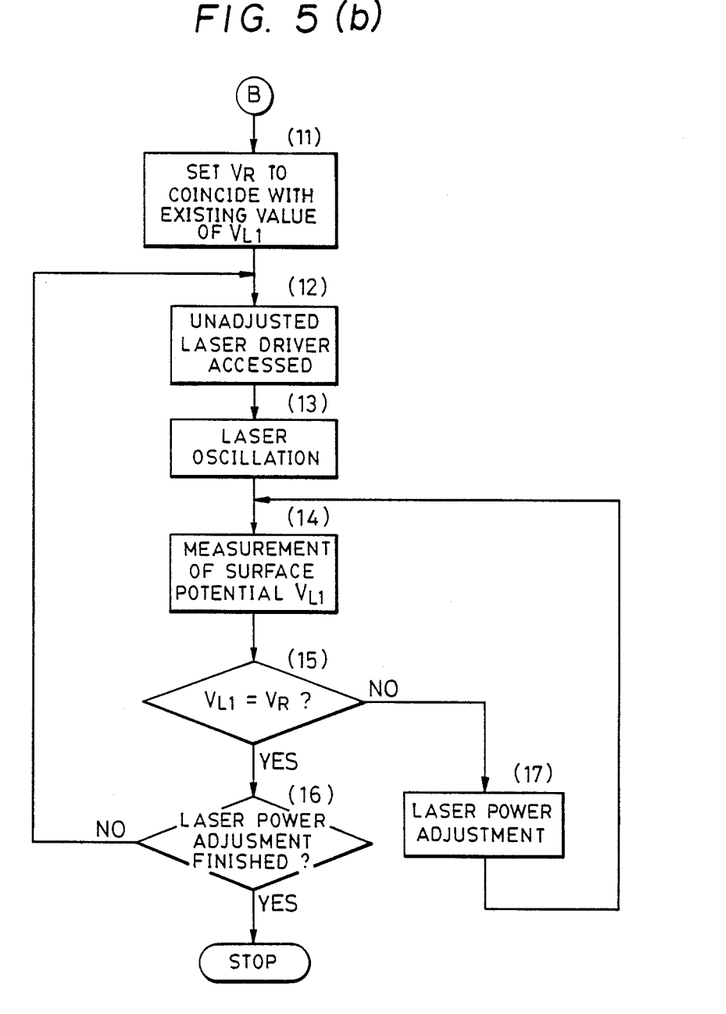

An explanation will be given as to the operation for adjusting the laser power, with specific reference to FIGS. 5(a) and 5(b) which are flow charts illustrating the laser-power adjusting process.

In Step 1, the semiconductor laser 4 associated with the photosensitive drum $45_C$ is activated, and a determination is made in Step 2 by the control section 1 as to whether the number N of the laser-power adjusting cycles which have been conducted up to that point has reached a predetermined number a. If the answer is No, i.e., if the number N is still less than a, the measuring circuit 7 computes in Step 3 the measured surface potential $V_{L1}$ of the photosensitive drum $45_C$ from the output of the potential sensor 6, in order to adjust the laser power of the semiconductor laser 4 associated with the photosensitive drum $45_C$. In Step 4, a determination is made as to whether the output from the measuring circuit 7, i.e., the measured surface potential $V_{L1}$ of the photosensitive drum $45_C$, coincides with the exposure potential $V_L$. If the answer is YES, i.e., if the measured potential $V_{L1}$ coincides with the exposure potential $V_L$, the number N is cleared to zero in Step 5 and a determination is made in Step 6 as to whether the sensitivity adjustment, i.e., the adjustment of the laser power has been completed for all photosensitive drums.

If the answer is YES, the process is finished, whereas, if the answer is NO, the process returns to Step 1 in order to conduct the adjustment of the laser power for another photosensitive drum.

If NO is the answer to the question posed in Step 4, the process proceeds to Step 7 in which a further determination is made as to whether the measured surface potential $V_{L1}$ is greater than the exposure potential $V_L$. If the answer is YES, i.e., if the measured surface potential $V_{L1}$ exceeds the exposure potential $V_L$, the laser power is increased by a predetermined value in Step 8 while effecting an increment by 1 of the number N of the adjusting cycle in Step 2.

If, on the other hand, the answer to the question posed in Step 2 is YES, i.e., if the number N of the laser power adjusting cycles has reached the predetermined number a, the microcomputer of the control section decides that the exposure potential $V_L$ cannot be obtained any more with the particular photosensitive drum, which is in this case the drum $45_C$, through the adjustment of the laser power. In such a case, the measured surface potential $V_{L1}$ as measured with the photosensitive drum $45_C$ is used as the command exposure potential $V_R$ for the other photosensitive drums $45_M$, $45_Y$ and $45_{BK}$ in Step 11, and the laser drivers 3 associated with these photosensitive drums $45_M$, $45_Y$ and $45_{BK}$ are accessed for adjusting the levels of the laser power. For instance, the laser driver 3 associated with the photosensitive drum $45_M$ is accessed in Step 12. In Step 13, the semiconductor laser 4 associated with this photosensitive drum $45_M$ is activated to expose the photosensitive drum $45_M$, and the measured surface potential $V_{L1}$ of the photosensitive drum $45_M$ is measured in Step 14 by the measuring circuit 7 from the output of the potential sensor 6. In Step 15, a determination is made as to whether the measured surface potential $V_{L1}$ coincides with the command exposure potential $V_R$.

If the answer is YES, the process proceeds to Step 16 in which a determination is made as to whether the adjustment of the laser power has been completed with respect to the other photosensitive drums $45_Y$ and $45_{BK}$. Then, the control is concluded if the answer is YES, whereas, if the answer is NO, the process returns to Step 12 so that the Steps 13 to 16 are followed until the adjustment of the laser power for other photosensitive drums is completed.

However, if NO is the answer in Step 15, the power of the semiconductor laser 4 associated with the photosensitive drum $45_M$ is adjusted in Step 17 so as to meet the condition of Step 15, i.e., to make the surface potential of the photosensitive drum $45_M$ coincide with the command exposure potential $V_R$. The process then proceeds to Step 14.

A second embodiment of the present invention will be described hereinunder with reference to FIGS. 6(a) and 6(b), as well as to FIGS. 3, 4(a) and 4(b).

With reference to FIG. 4(b), it will be understood that, if the level of the laser power from the laser unit $41_C$ is lowered, the surface potential of the photosensitive drum $45_C$ cannot be lowered below a level $V_{L1}$, so that the dynamic range at the exposure point 11 is restricted undesirably, as will be seen from the curve II in FIG. 4(b).

In a second embodiment of the present invention, therefore, the power of the laser beam emitted from the laser unit $41_C$ is detected by a photodiode 5. The output from the photodiode 5 is delivered through an A/D converter to the control section 1 in which a determination is made as to whether the detected laser power is high enough to provide the normal exposure potential $V_L$. If the laser power is insufficient to produce the normal surface potential $V_L$, the control section 1 further determines whether the normal exposure potential $V_L$ is obtainable through an adjustment of the laser power. If the control section 1 has determined that the normal surface potential is obtainable through an adjustment of the laser power, it delivers to the constant-current circuit 2 a driving current data of, for example, 8 bits. The 8-bit data is converted into an analog signal by the D/A converter $2a$ and the electric current in the laser driver 3 is adjusted by the thus obtained analog signal, so as to adjust the power of the semiconductor laser 4, thereby obtaining the normal exposure potential $V_L$ of the photosensitive drum $45_C$ after the exposure to the laser beam.

Conversely, when the control section 1 has determined that the power of the laser beam detected by the photodiode 5 is insufficient to generate the normal exposure potential $V_L$ on the drum $45_C$ owing to, for example, a failure in the laser unit $41_C$, the control section conducts the following control.

Namely, in this case, the level $P_1$ of the laser beam emitted from the laser unit $41_C$ is detected by the photodiode 5, and the thus detected laser power level $P_1$ is used as the command laser power level $P_1$ for the other laser units $41_M$, $41_Y$ and $41_{BK}$. Then, the constant-current circuit 2 delivers a driving current to the laser drivers 3 associated with their respective photosensitive drums $45_M$, $45_Y$ and $45_{BK}$, such that these photosensitive drums $45_M$, $45_Y$ and $45_{BK}$ are irradiated with the laser beam of the command power level $P_1$, thus optimizing the color balance of the reproduced image.

A description will be given hereinafter as to the manner in which the laser power is adjusted in the second embodiment of the present invention, with specific reference to FIGS. 6(a) and 6(b).

Figure 6A:
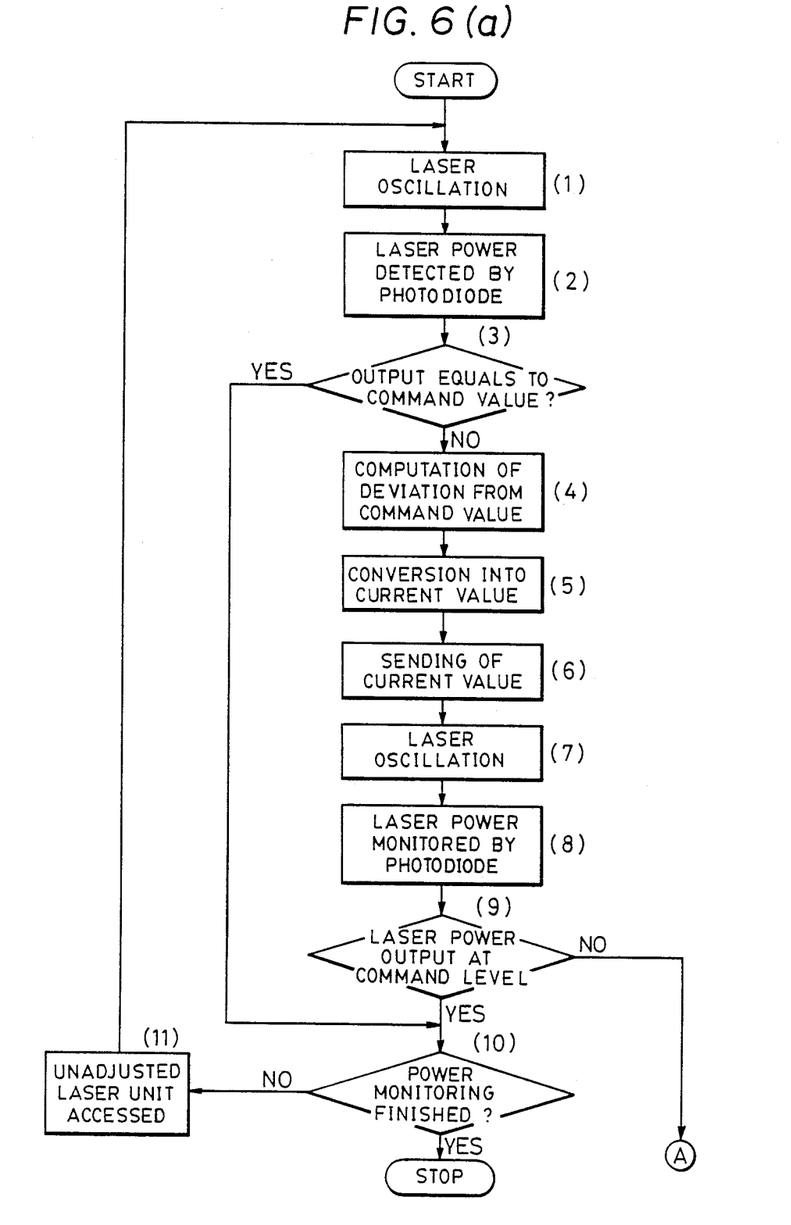
FIGS. 6(a) and 6(b) are flow charts illustrating a process for adjusting laser power in a second embodiment of the present invention.
Figure 6B:
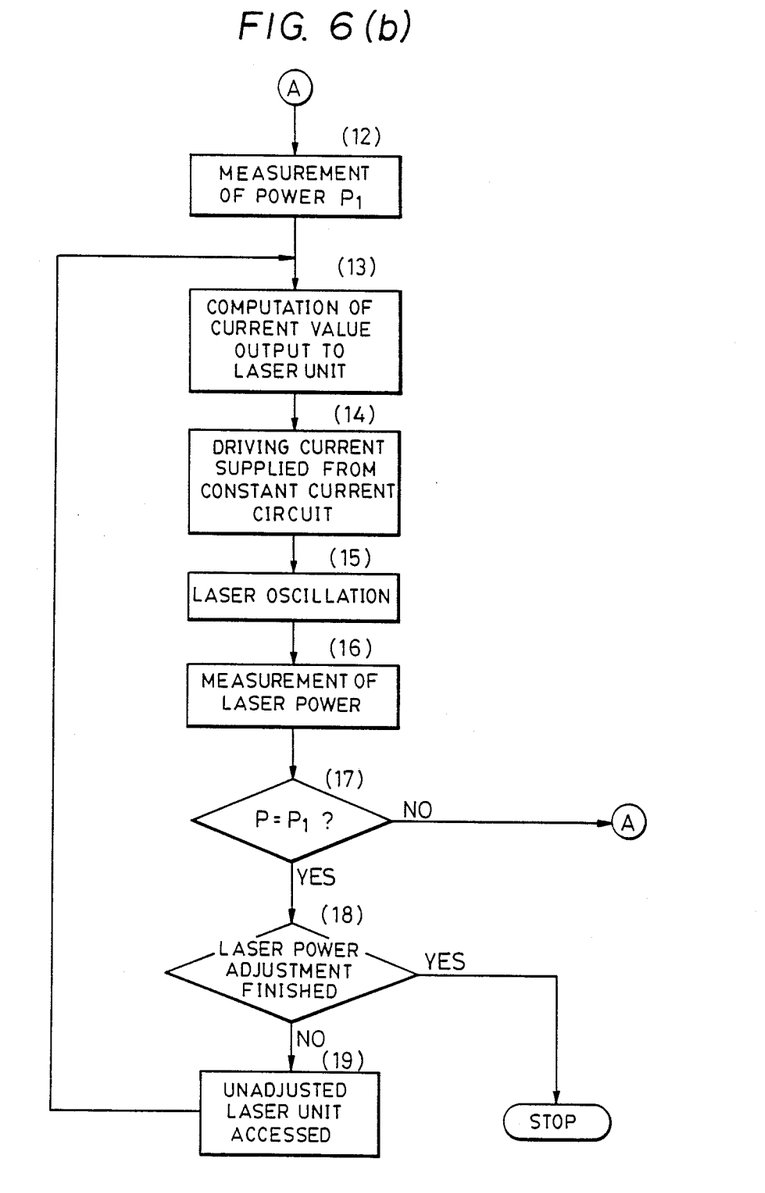

FIGS. 6(a) and 6(b) are flow charts of a program for adjusting the laser power. This program is pre-stored in a ROM which is incorporated in the control section 1.

The semiconductor laser 4 associated with one of the photosensitive drums, e.g., the drum $45_C$, is activated in Step 1, and the level of the power of the laser beam emitted from the semiconductor laser 4 is detected by the photodiode 5 in Step 2. Subsequently, a determination is made in Step 5 3 as to whether the output from the photodiode 5 coincides with a command value. If the answer is YES, the process proceeds to Step 10, whereas, when the answer is NO, the deviation of the output of the photodiode 5 from the command value is computed in Step 4. In Step 5, the computed deviation is converted into electric current and the thus obtained electric current is transmitted through the D/A converter 2a in Step 6. Then, in Step 7, the driving current is supplied from the constant-current circuit 2 to the laser driver 3 so as to activate the semiconductor laser 4 in such a manner that a laser power of the command level is obtained. The level of the laser power thus generated is detected by the photodiode 5 in Step 8, and a determination is made as to whether the detected laser power level coincides with the command level in Step 9.

If the answer to the question posed in Step 9 is YES, the process proceeds to Step 10 in which a determination is made as to whether the monitoring of the laser power level has been finished for the other laser units $41_M$, $41_Y$ and $41_{BK}$. If the answer is YES, the laser power adjusting process is completed, whereas, if NO, another laser unit which has not been adjusted is accessed in Step 11 and then the process returns to Step 1.

Conversely, when the recovery of the laser power is impossible owing to, for example, a deterioration of the laser unit, an answer NO is obtained in response to the question posed in Step 9 and the process proceeds to Step 12 in which the level $P_1$ of the laser power from the laser unit which failed to provide the laser power of the command level, e.g., the laser unit $41_C$, is measured. In Step 13, a computation is conducted to determine the value of the electric current which is to be applied to one of other laser units $41_M$, $41_Y$ and $41_{BK}$, e.g., to the laser unit $41_M$, so as to enable this laser unit to emit the laser beam at the power level $P_1$. Then, in Step 14, the constant-current circuit 2 delivers a driving current corresponding to the computed current value to the laser unit $41_M$, whereby the laser unit $41_M$ is activated in Step 15 so as to emit the laser beam. The level of the power of the laser beam emitted from the laser unit $41_M$ is measured by the photodiode 5 in Step 16 and a determination is made in Step 17 as to whether the measured laser power level P coincides with the value of the laser power $P_1$ which was measured in Step 12.

An answer NO to the question posed in Step 17 means that the power of the semiconductor laser 4 of the laser unit $41_M$ is the lowest among the semiconductor lasers 4 of the four laser units $41_C$, $41_M$, $41_Y$ and $41_{BK}$. The process, therefore, returns to Step 12, setting the power level $P_1$ of this semiconductor laser 4 as the new command $P_1$ of the laser power level. If the answer to the question posed in Step 12 is YES, the process proceeds to Step 18 in which a determination is made as to whether the adjustment of the laser power has been completed for all of the laser units. If the answer is YES, the process for controlling the laser power is finished, whereas, if the answer is NO, the process returns to step (13) after making access to another laser unit in Step 19.

As will be understood from the foregoing description, in the second embodiment of the present invention, the levels of the laser power of a plurality of laser units are adjusted in conformity with the level of the laser power from the laser having the lowest power. It is, therefore, possible to obtain a color image of a good color balance.

Although the invention has been described in specific terms, it is to be understood that the described embodiment is only illustrative and various changes and modifications may be imparted thereto without departing from the scope of the invention which is limited solely by the appended claims.

What is claimed is:

1. In a recording apparatus, the combination of:
   first and second beam emitting means for emitting first and second beams for recording;
   first detection means for detecting the power of said first beam emitted from said first beam emitting means;
   control means for controlling, in accordance with the detection output from said detection means, the power of said second beam emitted from said second beam emitting means, wherein said control means includes setting means responsive to the output from said detection means which corresponds to a power of said first beam less than a predetermined level, to set the power of said second beam in accordance with said output; and
   second detection means for detecting the power of said second beam from said second beam emitting means, said control means being connected to receive outputs from said first and second detection means and to control the power of said second beam to make it coincide with the power set by said setting means.

2. A recording apparatus according to claim 1, wherein said control means is arranged to control driving current supplied to said first and second beam emitting means and thereby control the power of said first and second light beams.

3. A recording apparatus according to claim 1, wherein said control means is arranged to control the power of said first beam in accordance with the detection output of said first detection means so as to maintain the power of said first beam at the predetermined level.

4. In a recording apparatus, the combination of:
   first and second beam emitting means for emitting first and second beams for recording;
   first detection means for detecting the power of said first beam emitted from said first beam emitting means;
   control means for controlling, in accordance with the detection output from said detection means, the power of said second beam emitted from said second beam emitting means; and
   first and second recording mediums arranged in conjunction with said beam emitting means for recording images in accordance with the first and second beams emitted from said first and second beam emitting means.

5. In a recording apparatus the combination of:
   first and second beam emitting means for emitting first and second beams for recording;
   first detection means for detecting the power of said first beam emitted from said first beam emitting means;
   control means for controlling, in accordance with the detection output from said detection means, the power of said second beam emitted from said second beam emitting means wherein said control means includes setting means responsive to the output from said detection means which corresponds to a power of said first beam less than a predetermined level, to set the power of said second beam in accordance with said output; and second detection means for detecting the power of said second beam emitted from said second beam emitting means, said control means being connected to receive outputs from said first and second detection means and, in response to the detection output from said first detection means which corresponds to a power of said first beam reaching said predetermined level, and in response to the detection output of said second detection means, to control the power of said second beam to a predetermined level.

6. In a recording apparatus, the combination of:
first and second beam emitting means for emitting first and second beams for recording;
first and second detection means for detecting the power of said first and second beams from said first and second beam emitting means; and
control means for controlling the power of said first and second beams in response to outputs from said first and second detection means;
said control means being arranged to maintain a predetermined relationship between the power of said first and and second beams and to control the power of said second beam in accordance with the detection output from said first detection means.

7. A recording apparatus according to claim 6, further comprising third beam emitting means for emitting a third beam, and a third detection means for detecting the power of said third beam from said third beam emitting means, said control means being arranged to control the power of said first, second and third beams in accordance with the detection outputs from said first, second and third detection means such that a predetermined relationship is maintained among the power of said first, second and third beams.

8. A recording apparatus according to claim 7, further comprising first, second and third recording mediums arranged in conjunction with said beam emitting means for recording images in accordance with said first, second and third beams emitted from said first, second and third beam emitting means.

9. A recording apparatus according to claim 6, wherein said control means includes setting means responsive to the output from said first detection means which corresponds to a power of said first beam less than a predetermined level, to set the light quantity of said second beam in accordance with said output.

10. A recording apparatus according to claim 9, wherein said control means is arranged to control the power of said second beam in accordance with the output from said second detection means to make the power of said second beam coincide with the power set by said setting means.

11. A recording apparatus according to claim 9, wherein said control means is arranged to control driving current supplied to said first and second beam emitting means and thereby control the power of said first and second light beams.

* * * * *

UNITED STATES PATENT AND TRADEMARK OFFICE
CERTIFICATE OF CORRECTION

PATENT NO. : 4,821,065
DATED : April 11, 1989
INVENTOR(S) : HIROAKI ISHII, ET AL.

It is certified that error appears in the above-identified patent and that said Letters Patent is hereby corrected as shown below:

COLUMN 2

Line 28, "Transfer charges $44_c$, $44_M$," should read --Transfer chargers $44_c$, $44_M$,--.

COLUMN 6

Line 36, "to data" should read --to the constant-current circuit 2. This 8-bit driving current data--.

COLUMN 12

Line 16, "light quantity" should read --power--.

Signed and Sealed this

Seventeenth Day of October, 1989

*Attest:*

DONALD J. QUIGG

*Attesting Officer*      *Commissioner of Patents and Trademarks*